US008826175B2

(12) United States Patent  
Wallis et al.

(10) Patent No.: US 8,826,175 B2  
(45) Date of Patent: Sep. 2, 2014

(54) METHOD AND APPARATUS FOR MANAGING ACTIVITIES

(75) Inventors: R. Tyler Wallis, Dallas, TX (US); William Stanley Robbins, Sun Prairie, WI (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1204 days.

(21) Appl. No.: 12/326,665

(22) Filed: Dec. 2, 2008

(65) Prior Publication Data

US 2010/0138788 A1    Jun. 3, 2010

(51) Int. Cl.

| G06F 3/048 | (2013.01) |
| H04N 21/4223 | (2011.01) |
| H04N 21/442 | (2011.01) |
| H04N 7/173 | (2011.01) |
| H04N 21/422 | (2011.01) |
| H04N 21/258 | (2011.01) |
| H04N 21/478 | (2011.01) |
| H04N 7/15 | (2006.01) |
| H04N 21/4788 | (2011.01) |

(52) U.S. Cl.
CPC .......... *H04N 7/173* (2013.01); *H04N 21/4223* (2013.01); *H04N 21/44218* (2013.01); *H04N 21/42203* (2013.01); *H04N 21/25866* (2013.01); *H04N 21/478* (2013.01); *H04N 7/15* (2013.01); *H04N 21/4788* (2013.01)
USPC ............................ 715/810; 715/825; 715/840

(58) Field of Classification Search
CPC ..................................................... G06F 3/048
See application file for complete search history.

(56) References Cited

U.S. PATENT DOCUMENTS

| 7,227,498 | B2 | 6/2007 | Soliman |
| 2004/0176107 | A1 | 9/2004 | Chadha |
| 2005/0097440 | A1* | 5/2005 | Lusk et al. ................ 715/500.1 |
| 2007/0088852 | A1* | 4/2007 | Levkovitz .................... 709/246 |
| 2007/0168892 | A1* | 7/2007 | Brush et al. .................. 715/963 |
| 2007/0217585 | A1* | 9/2007 | Wollmershauser et al. ........................ 379/201.01 |
| 2007/0250784 | A1* | 10/2007 | Riley et al. .................... 715/764 |
| 2008/0005168 | A1* | 1/2008 | Huff et al. ................. 707/104.1 |

OTHER PUBLICATIONS

LeaderTask 4.3, Almeza Research, LeaderTask.com, archived by the Internet Wayback Machine Jul. 2, 2007, Screenshots show the relevant portions (Leader).*
Jim Boyce, "Microsoft® Office Outlook® 2007 Inside Out", Published Jan. 31, 2007, Microsoft Press.*

(Continued)

*Primary Examiner* — Boris Pesin
*Assistant Examiner* — Matthew Ell
(74) *Attorney, Agent, or Firm* — Guntin & Gust, PLC; Joseph P. Hrutka

(57) ABSTRACT

A system that incorporates teachings of the present disclosure may include, for example, a communication device having a controller adapted to present a task toolbar by way of a display of the communication device, create an entry in the task toolbar, identify a party responsible for one or more tasks associated with the entry, associate the party with the entry and update the task toolbar to show by way of the display the association of the party to the entry, create one or more tasks, associate the one or more tasks with the entry of the party in the task toolbar, and synchronize one or more communication resources of the party according to the entry associated with the party and the associated one or more tasks. Other embodiments are disclosed.

25 Claims, 12 Drawing Sheets

(56) References Cited

OTHER PUBLICATIONS

"BedeWork: Open Source Calendar for the Enterprise", Archived by the Internet Wayback Machine Nov. 22, 2007.*

"Advantages and Disadvantages of Using Presence Service", Arturo Salinas, TKK T-110.5190 Seminar on Internetworking, May 4-5, 2006.*

"Microsoft Exchange Server 2007: Mobile Messaging with Exchange ActiveSync", Nov. 2006.*

\* cited by examiner

METHOD AND APPARATUS FOR MANAGING ACTIVITIES

FIELD OF THE DISCLOSURE

The present disclosure relates generally to communication techniques and more specifically to a method and apparatus for managing activities.

BACKGROUND

In today's busy environment, it is common to forget tasks or items of necessity in a work or home setting. Some individuals use a task management tool such as the task manager in Microsoft Outlook™ to track tasks completed versus those pending. These tools however generally operate in a single device (such as a desktop computer) which may not be portable.

DETAILED DESCRIPTION

One embodiment of the present disclosure can entail a communication device having a controller adapted to present a task toolbar by way of a display of the communication device, create an entry in the task toolbar, identify a party responsible for one or more tasks associated with the entry, associate the party with the entry and update the task toolbar to show by way of the display the association of the party to the entry, create one or more tasks, associate the one or more tasks with the entry of the party in the task toolbar, and synchronize one or more communication resources of the party according to the entry associated with the party and the associated one or more tasks. The communication resources can operate in one or more independently operated devices.

Another embodiment of the present disclosure can entail presenting a multiparty task toolbar, creating in the multiparty task toolbar an entry associated with a party, creating one or more tasks for the party, assigning the one or more tasks to the entry of the party, and synchronizing one or more communication resources of the party with the entry in the multiparty task toolbar associated with the party.

Yet another embodiment of the present disclosure can entail a web server operating as a portal. The web server can have a controller to present a user interface (UI) for entering tasks and calendar events, create one or more tasks, assign the one or more tasks to a party, record the one or more tasks and their association to the party, and synchronize one or more communication devices of the party with the recorded tasks.

Figure 1:
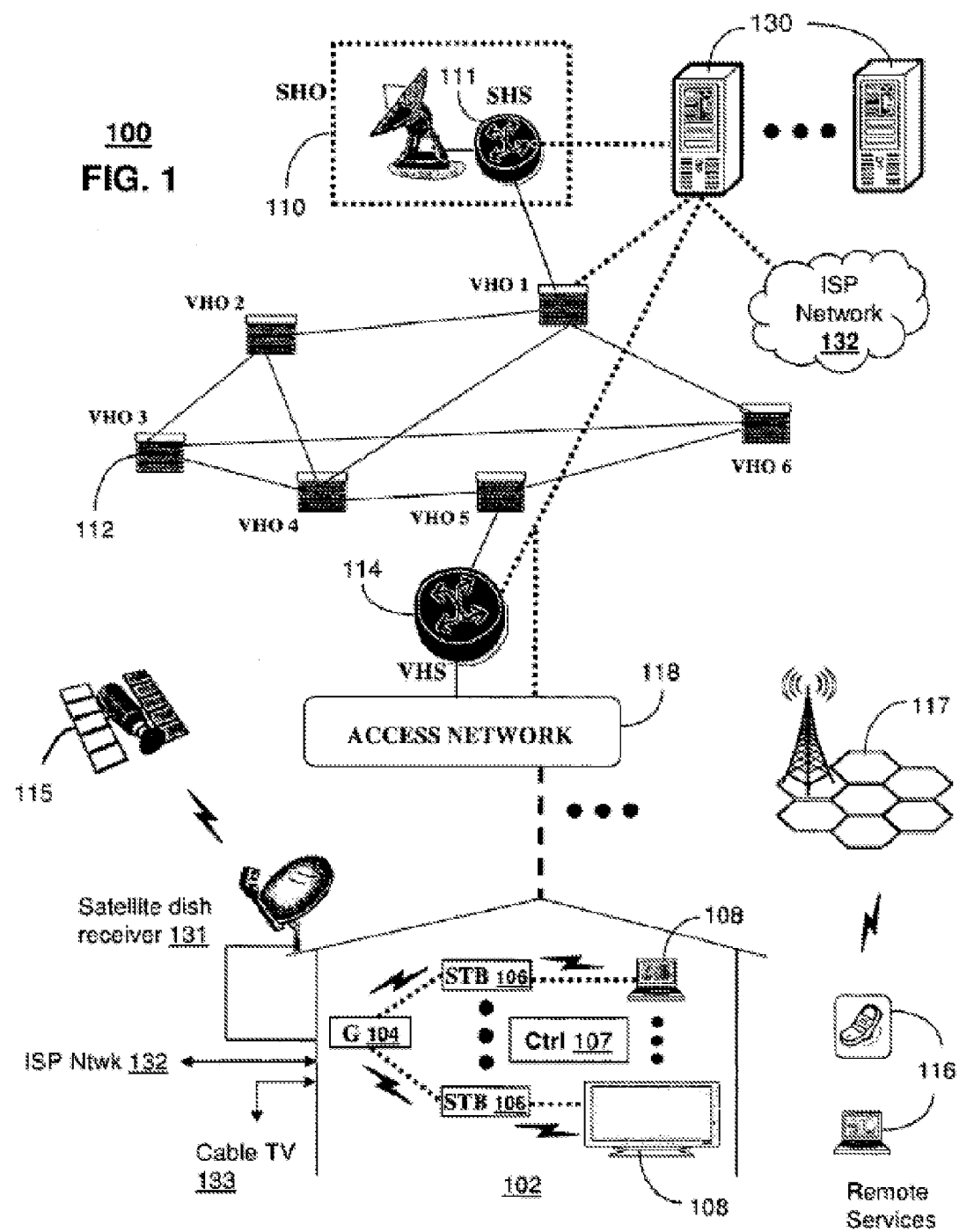
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the one or more computing devices 130 can be used as a presence system 130 (herein referred to as presence system 130) for collecting presence information associated with users of the first communication system 100. Presence information can indicate for example the whereabouts of users as well as the communication devices in use by these users. The whereabouts of a user can be determined from GPS coordinates transmitted by communication devices of the users to the presence system 130, or from triangulation analysis performed from data provided by base stations such as reference 117.

The presence system 130 can determine which communication devices are in use by a user by monitoring network activity generated thereby, or from status information provided by the communication devices. The presence system 130 can for example determine from network activity derived from common network elements such as switches or routers that a user is working from a computer terminal at his/her office, utilizing a cellular phone, office phone, home phone, or otherwise. The presence system 130 can make a similar determination by polling communication devices of the user to determine their state of usage.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
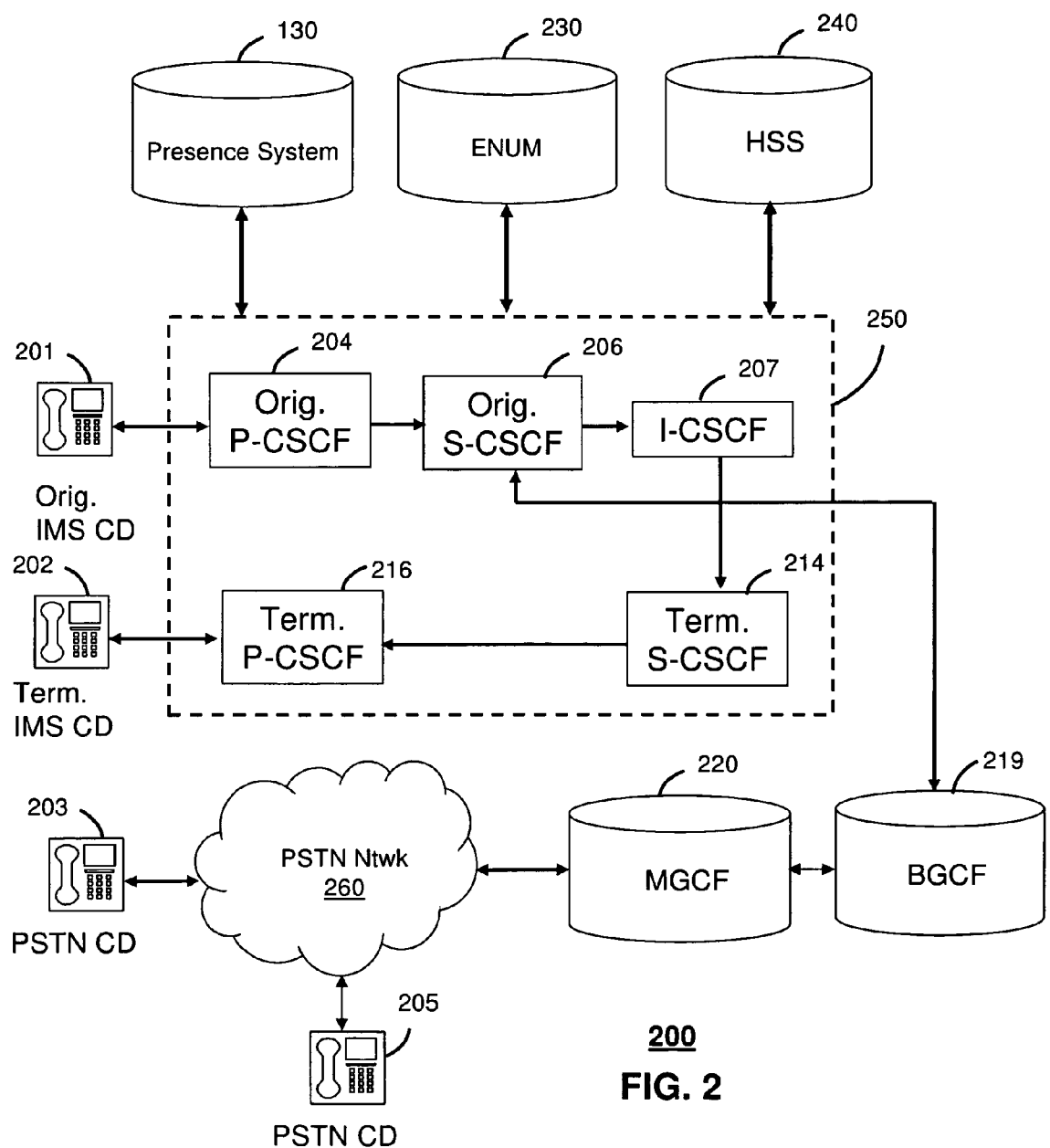

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The presence system 130 of FIG. 1 can be operably coupled to the second communication system 200 for purposes similar to those described above.

Figure 3:
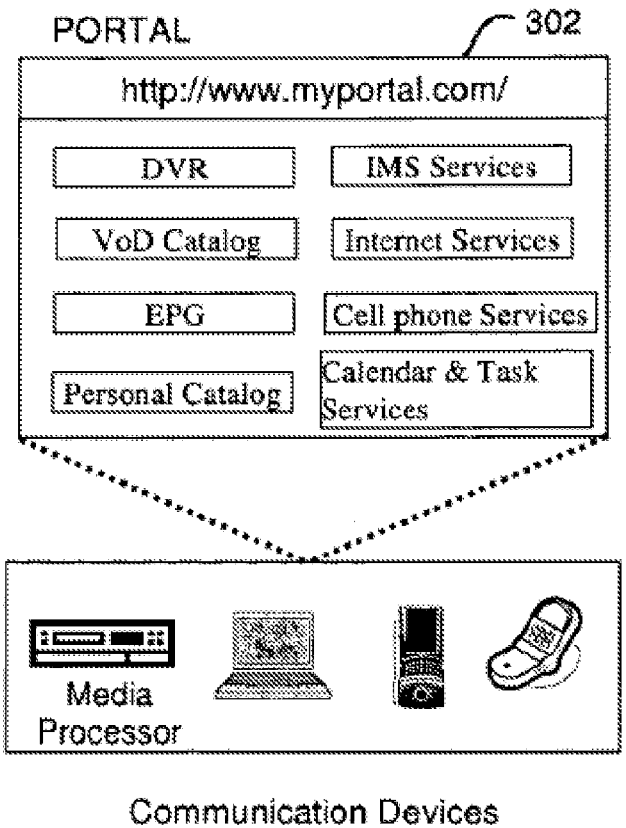
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, provisioning calendar and task services, and so on.

Figure 4:
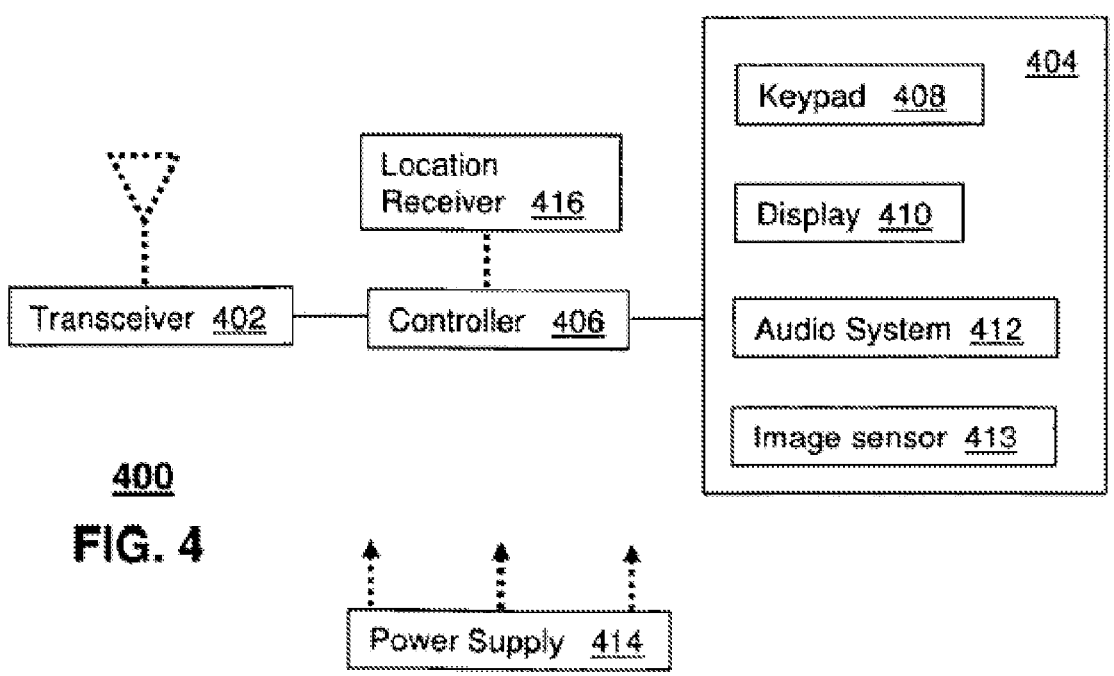
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
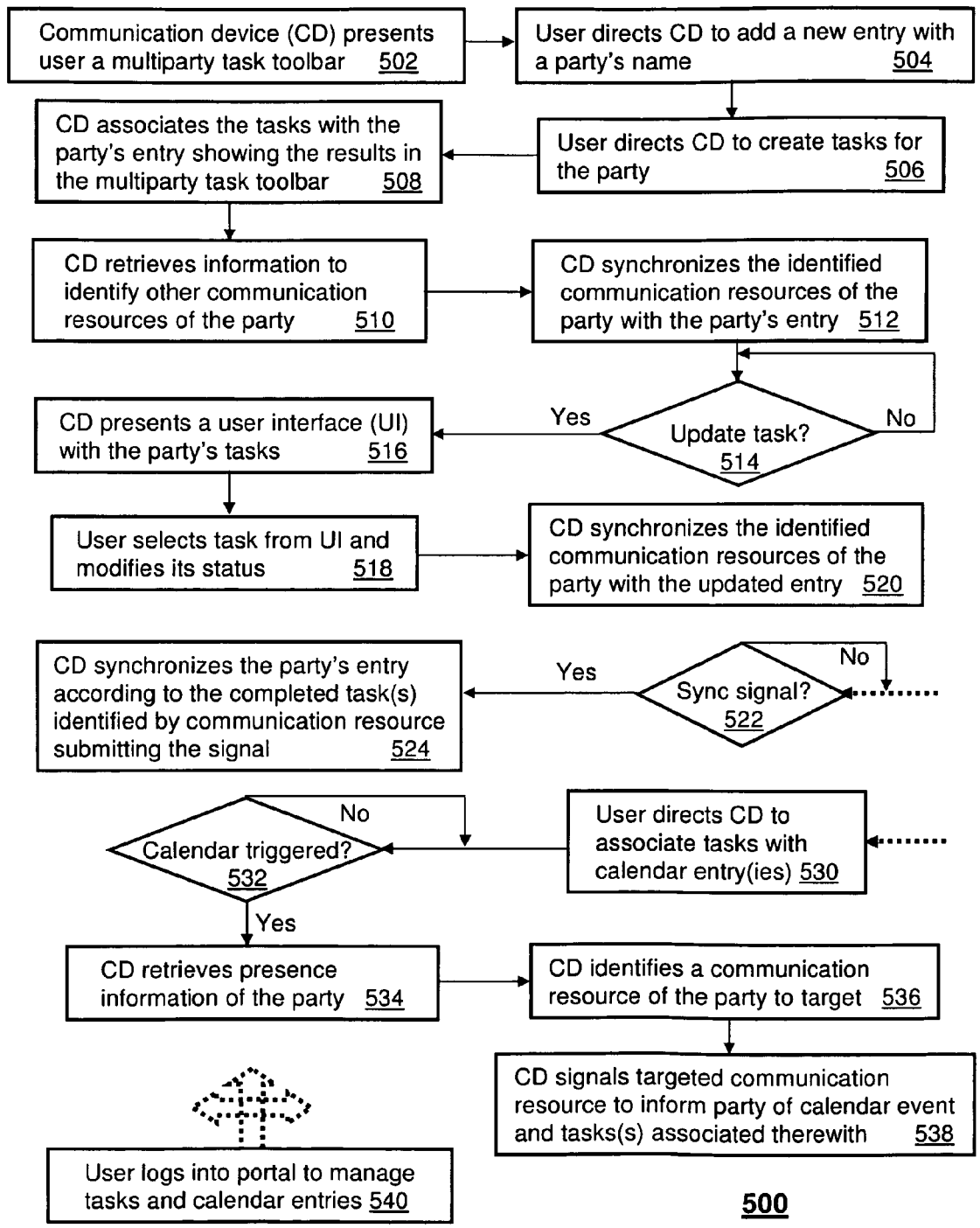
FIG. 5 depicts an illustrative embodiment of a method according to the present disclosure.
Figure 6:
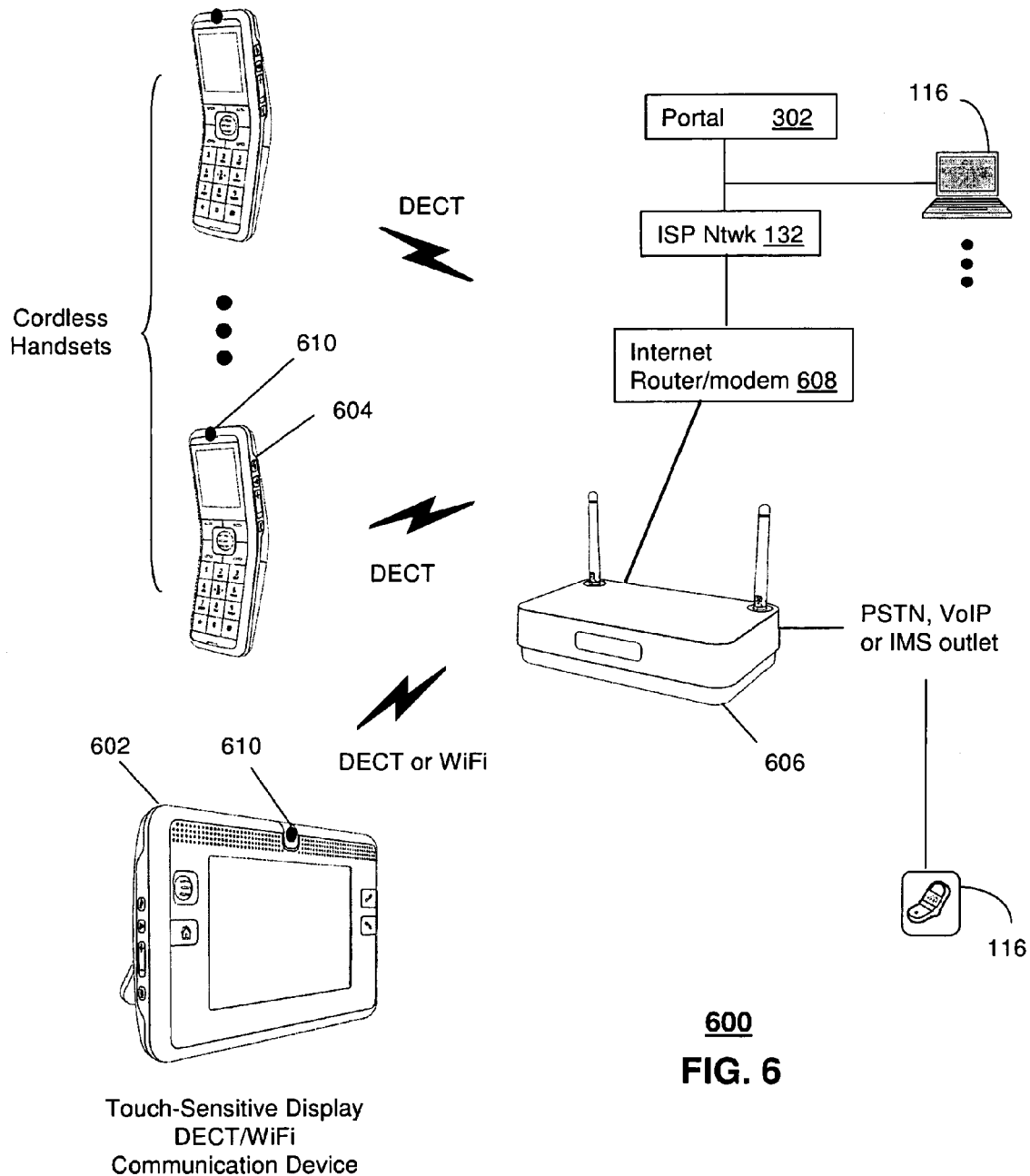
FIGS. 6-12 depict illustrative embodiments of the method of FIG. 5.

FIG. 5 depicts an illustrative method 500 for managing tasks. FIG. 6 shows an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the portal 302, a computer 116 or other communication devices accessible by way of the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as charged coupled device sensors) which can enable these devices to support video communication services.

Figure 7:
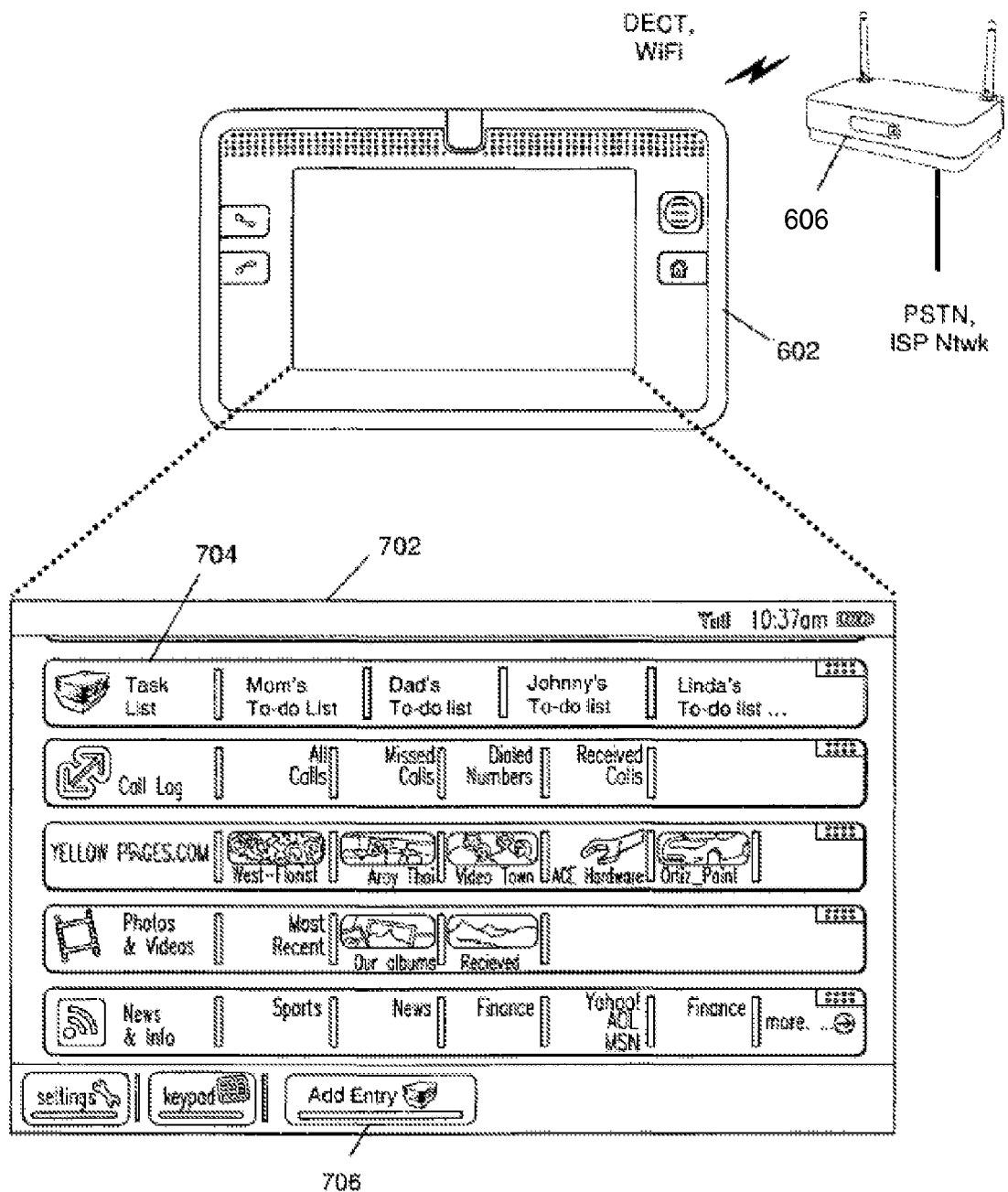

With the configuration of FIG. 6 in mind, method 500 can begin with step 502 in which one of the communication devices of FIG. 6 presents a user a user interface (UI) with a multiparty task toolbar. An illustrative embodiment of the UI 702 and multiparty task toolbar 704 is shown in FIG. 7. In the present illustration there are four entries in the multiparty task toolbar: Mom's to-do list, Dad's to-do list, Johnny's to-do list, and Linda's to-do list. These entries can represent a family or other grouping. The illustration of FIG. 7 can also be extended to individuals in a work environment.

Figure 8:
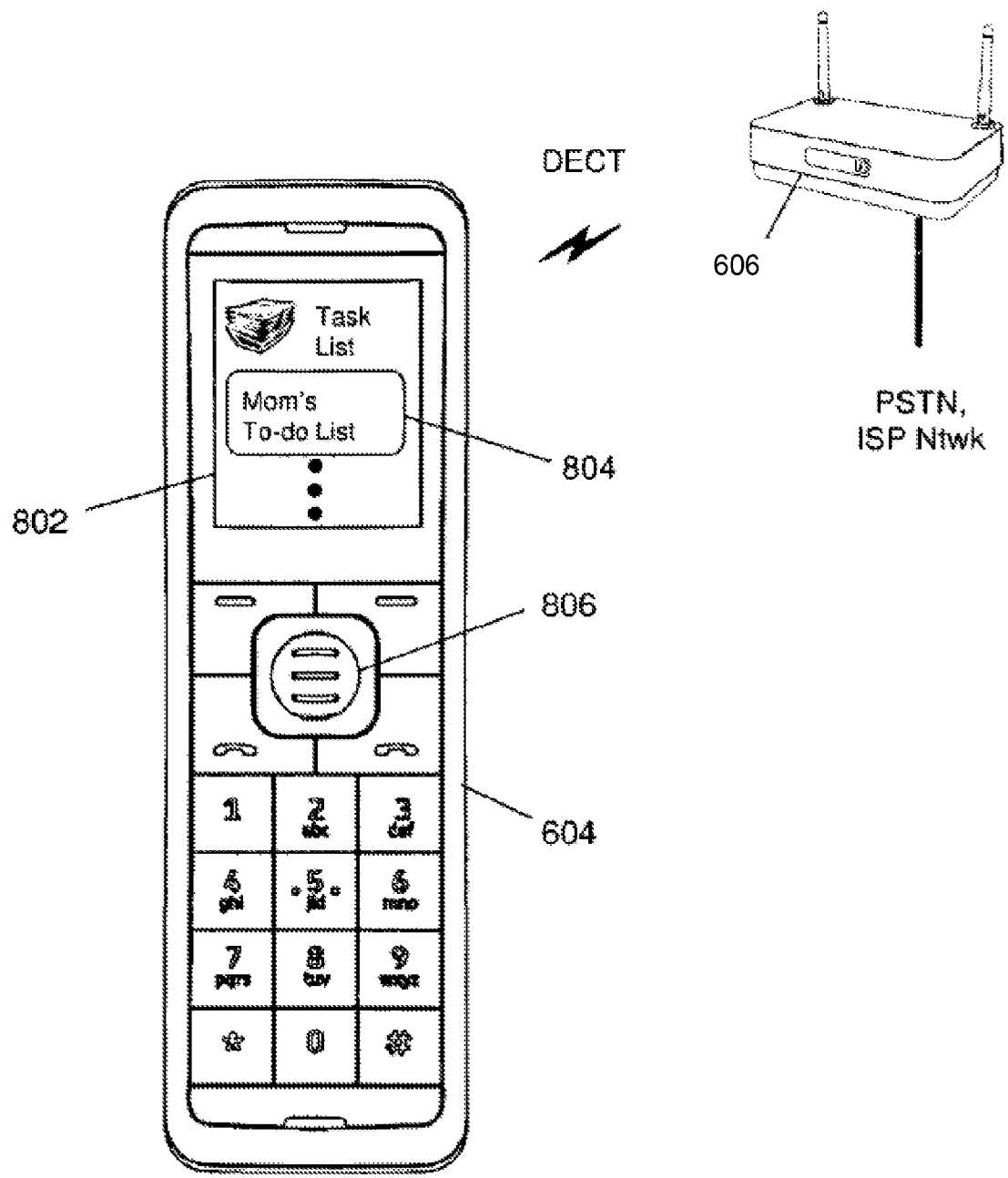
Figure 9:
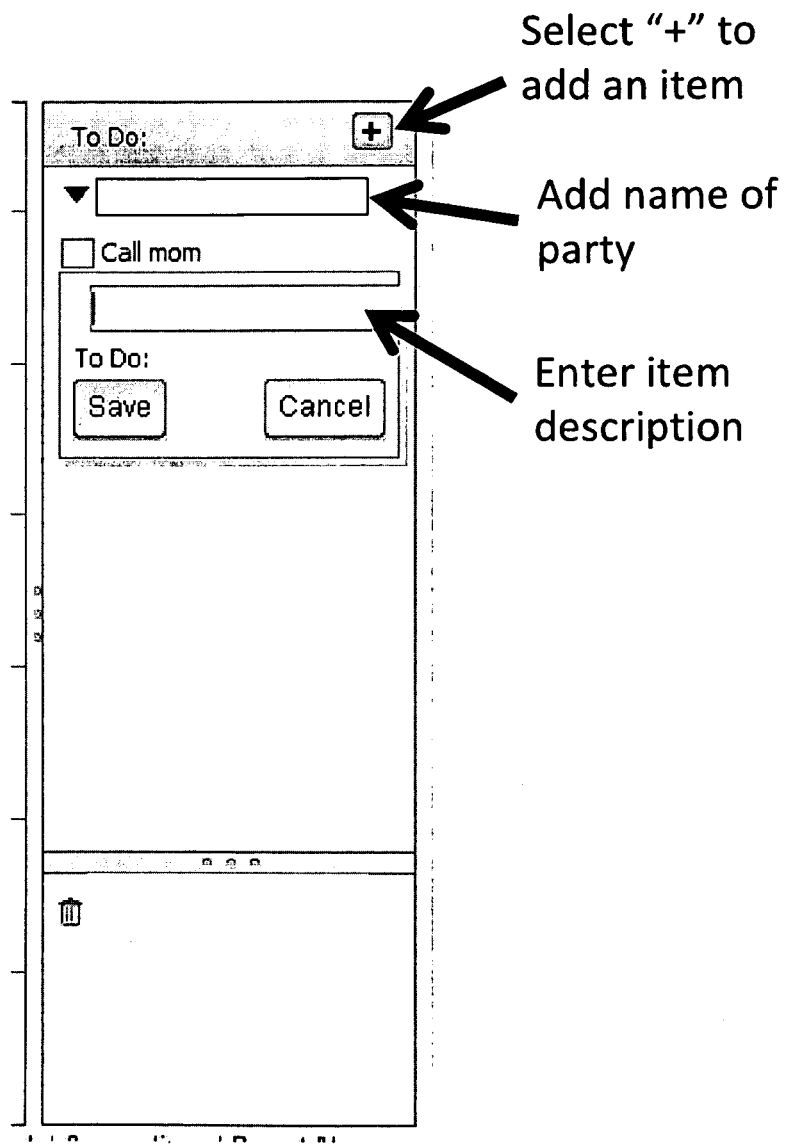

In step 504, the user can direct the communication device to add a new entry with a party's name. Suppose for instance that the entry for Linda's to-do list was not present at the time the UI 702 was presented to the user. The user can select, for example, the "Add Entry" button 706 at the bottom of the UI 702. The selection of button 706 can invoke another portion of the UI 702 such as shown in FIG. 9 for adding the name of the party ("Linda's to-do list"), and for creating new tasks in step 506. The combination of steps 504 and 506 can cause the communication device in step 508 to associate the tasks with the party's entry resulting in the new entry being presented in the multiparty task toolbar 704 of FIG. 7. The results can also be shown in the accompanying handsets 604 as shown in FIG. 8. Since the display of the handsets 604 is smaller, the handsets present an adapted UI 802 with each party's entry 804 shown individually as scrollable items which can be located by manipulating a roller ball 806.

In step 510 the communication device can retrieve information to identify other communication resources of the party. The information can be retrieved from an address book of the communication device, or from a remote resource communicatively coupled to the communication device. The other communication resources of the party can include an office phone, a cellular phone, a home computer, an office computer, or a personalized portal account (such as reference 302). The communication device can use the communication identifiers (phone numbers, IP addresses, SIP URI's, URL's, etc.) of the communication resources of the party to submit in step 512 a synchronization signal that synchronizes them with the party's entry. The synchronization signal can include the information describing the newly entered item in the task toolbar.

Suppose, for example, that the tasks created for Linda are: Call mom, Wash Windows, Change light bulb, and so on. Step 512 can use common synchronization technology such as for example a web-based distributed authoring and versioning protocol (WebDAV) or a derivative thereof to synchronize task management software operating in the other communication resources of Linda with the communication device in question. In this manner no matter which communication resource Linda uses at any particular time, Linda can review her to-do list and manage the state of the items in the list.

Figure 10:
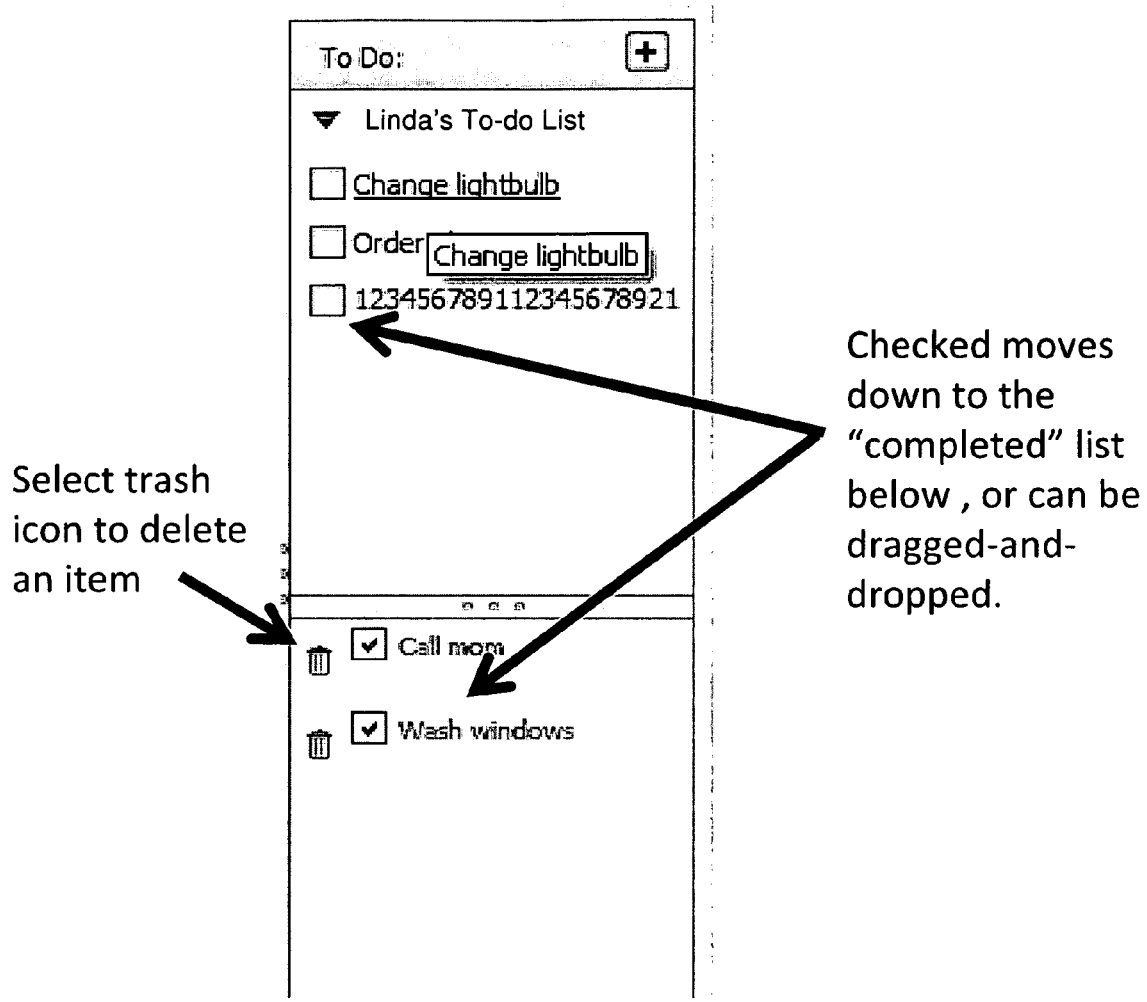

In step 514, any of the parties listed in the multiparty toolbar can invoke an update. Suppose for example that Linda has completed one of the tasks. In step 514, she can touch her entry on the touch-sensitive display of the communication device with an index finger, which causes the communication device in step 516 to present a UI with the party's tasks as shown in FIG. 10. In this illustration, Linda can select in step 518 a checkbox to indicate a completed task or she can drag and drop the pending task to another section of the UI representing completed tasks. In another embodiment, Linda can drag and drop items in the completed tasks section into the pending tasks section. This action can create new pending tasks. The results of these updates can cause the communication device in step 520 to invoke another synchronization step to notify the other communication resources used by Linda.

Steps 516 and 518 can also occur from one of Linda's communication resources (e.g., her desktop computer). The communication device can asynchronously monitor synchronization signals from Linda's other communication resources in step 522. When a synchronization signal is detected such as from Linda's desktop computer, the communication device proceeds to step 524 where it synchronizes Linda's entry according the completed tasks identified by the communication resource in the synchronization signal.

In another embodiment, the communication device of FIG. 6 can be programmed to associate in step 530 the tasks of a party with calendar entries as directed by the user. Thus the calendar application and the task management application can operate cooperatively to assist the party in completing tasks. For example, Linda's task to Call mom can be scheduled by way of the calendar tool to invoke a notice at 4:30 pm. When the calendar event 532 to call mom is detected, the communication device can be programmed to retrieve in step 534 presence information associated with Linda from the presence system 130 discussed above. The presence information can for example identify which communication resource is in use by Linda at the time the event was triggered.

The presence information can indicate in step 536 for example that Linda is not in the vicinity of the communication device that detected the triggered calendar event, but rather is carrying her cellular phone. The communication device can proceed to step 538 where it can transmit a signal to the cellular phone to remind Linda to call her mother. The signal can be a short messaging service (SMS) message or other suitable signal which alerts Linda of the task at hand. To get Linda's attention, the signal received by the cellular phone can cause it to assert an audible and/or a visual alert to inform Linda of the task at hand. The audible alert can be tailored to something that Linda recognizes as a task (such as periodic short double beeps). The visual alert can be represented by a pop-up GUI that arises on a display of Linda's cellular phone when the signal arrives.

It should be noted that tasks that are associated with calendar events can be synchronized with the communication resources of the party according to other common protocols such as calendaring extensions to WebDAV commonly referred to as CalDAV.

Figure 11:
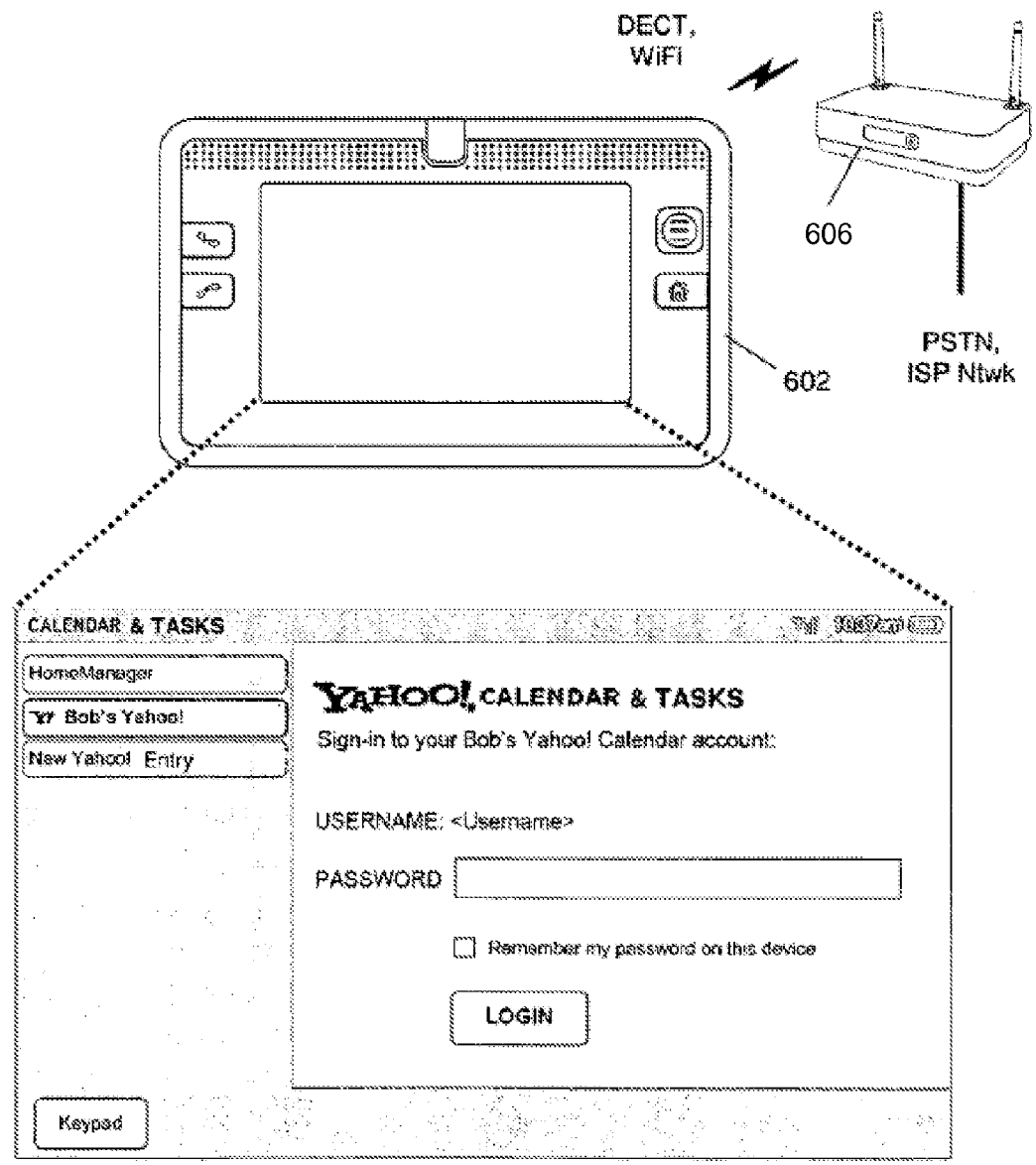
Figure 12:
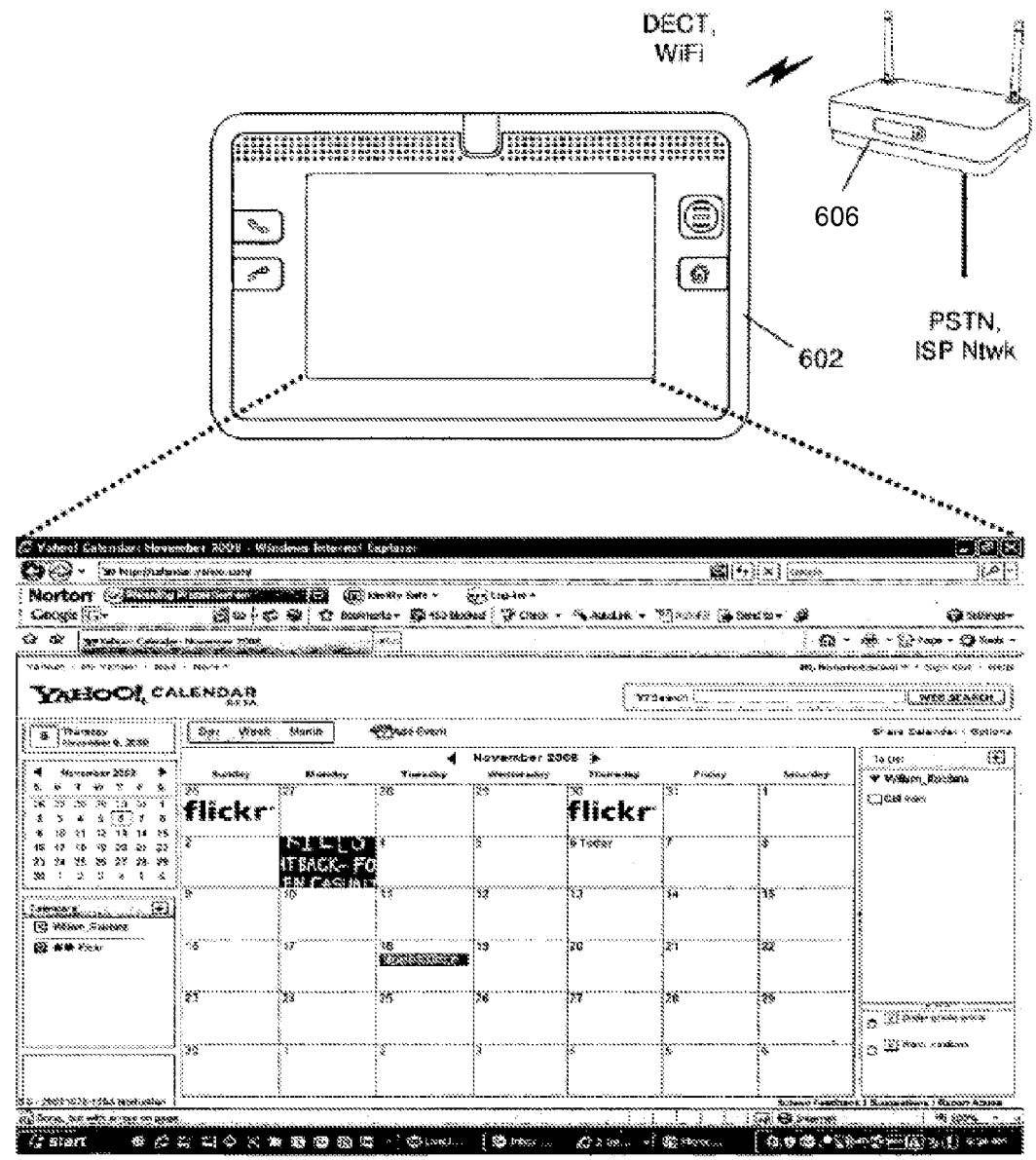

In another embodiment of the present disclosure, a party can manage tasks and calendar entries from a portal 302 in step 540. The portal 302 can be adapted to implement the steps of method 500 in whole or in part. A user of the portal 302 can log into the portal by way of a common log-in screen such shown in FIG. 11, thereby generating a calendar and task GUI as shown in FIG. 12. At this step the user can manipulate the GUI to create tasks and identify completed tasks in a manner similar to what was described above. The portal 302 can also invoke synchronization actions as described above.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that the handsets 604 can perform in whole or in part the functions described above for the tablet 602. Method 500 can also be adapted to remove the presence information step of 534 and instead transmit a synchronization signal to all of the communication resources of the party associated with the triggered event.

Other suitable modifications can be applied to the present disclosure without departing from the scope of the claims below. Accordingly, the reader is directed to the claims section for a fuller understanding of the breadth and scope of the present disclosure.

Figure 13:
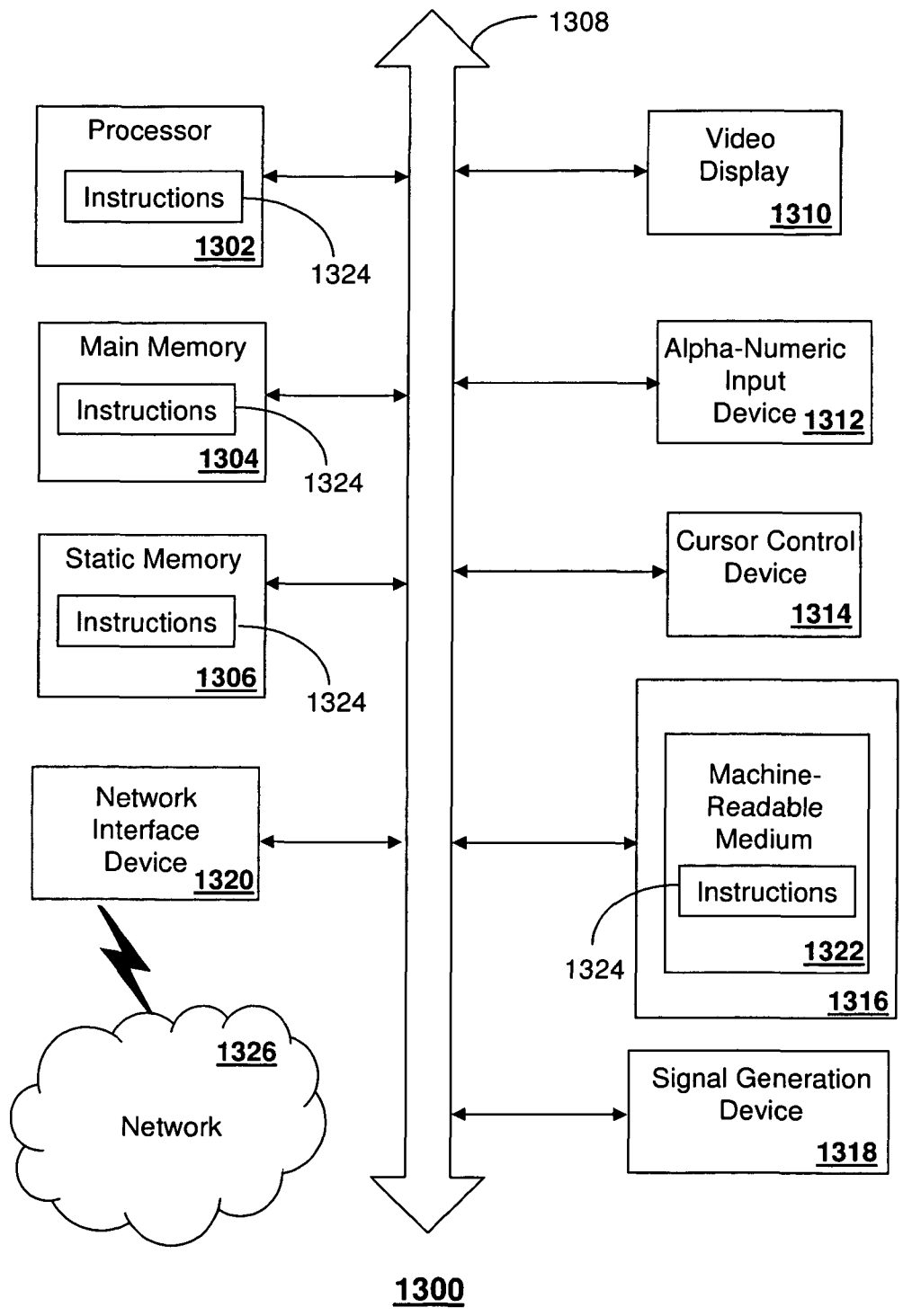
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
    a memory having computer instructions;
    a display; and
    a controller coupled with the memory and the display, wherein executing the computer instructions causes the controller to perform operations comprising:
        presenting a task toolbar by way of the display as a presented task toolbar;
        creating an entry in the task toolbar responsive to receiving entry data associated with the task toolbar;
        identifying a party responsible for tasks associated with the entry;
        associating the party with the entry and updating the task toolbar to show by way of the display the association of the party to the entry;
        creating a task associated with the entry;
        associating the task with the entry of the party in the task toolbar;
        responsive to creation of the task:
            retrieving information to identify a group of other communication resources of independently operated devices of the party as an identified group of other communication resources of independently operated devices of the party; and
            sending a task creation signal to the identified group of other communication resources of independently operated devices of the party to synchronize task data stored at the identified group of other communication resources of the independently operated devices of the party according to the entry associated with the party and the task, the task data being configured for generating other task toolbars by the other communication resources that are synchronized with the task toolbar;
        presenting a user interface depicting tasks associated with the party on the display, wherein the user interface comprises a pending task window and a completed task window;
        detecting a request to drag and drop a pending task in the pending task window from the pending task window to the completed task window; and
        updating the completed task window to display that the pending task is now a completed task in the completed task window responsive to the request to drag and drop the pending task from the pending task window to the completed task window.

2. The communication device of claim 1, wherein the group of communication resources comprise a wireless communication device and a portal, and wherein the task toolbar comprises the user interface enabling the drag and drop manipulation of the task.

3. The communication device of claim 1, wherein the communication device comprises a cordless phone providing voice and data communications by way of a base unit, and wherein the cordless phone and the base unit are communicatively coupled by way of a cordless phone protocol and a wireless data communications protocol.

4. The communication device of claim 1, wherein executing the computer instructions causes the controller to perform operations comprising retrieving information to identify the communication resources of the party from an address book of the party.

5. The communication device of claim 1, wherein executing the computer instructions causes the controller to perform operations comprising
sending an update signal to synchronize the identified group of other communication resources of the independently operated devices to reflect that the pending task is now the completed task.

6. The communication device of claim 1, wherein executing the computer instructions causes the controller to perform operations comprising:
receiving a first update signal from one of the other communication resources of the party indicating that the task has been completed by the other communication resources of the party;
updating the entry of the party in the task toolbar to reflect the completion of the task as an updated entry; and
sending a second update signal to further synchronize the task data stored at the identified group of other communication resources of independently operated devices of the party with the updated entry in the task toolbar associated with the party to reflect the completion of the task.

7. The communication device of claim 1, wherein executing the computer instructions causes the controller to perform operations comprising associating the tasks created with a calendar event to create an associated calendar event.

8. The communication device of claim 7, wherein executing the computer instructions causes the controller to perform operations comprising:
detecting a trigger of the calendar event as a triggered calendar event;
retrieving presence information associated with the party;
identifying from the presence information one of the other communication resources; and
signaling the identified communication resource of the triggered calendar event.

9. The communication device of claim 8, wherein signaling the identified communication resource of the triggered calendar event causes the identified communication resource to assert an audible alert that informs the party of the triggered calendar event.

10. The communication device of claim 8, wherein signaling the identified communication resources of the triggered calendar event causes the identified communication resource to assert a visual alert that informs the party of the triggered calendar event.

11. The communication device of claim 7, wherein executing the computer instructions causes the controller to perform operations comprising sending a signal to synchronize the task and the associated calendar event with the identified group of other communication resources of the independently operated devices of the party.

12. The communication device of claim 1, wherein executing the computer instructions causes the controller to perform operations comprising utilizing a web-based distributed authoring and versioning protocol to synchronize the task associated with the calendar event with a calendar system of one of the identified group of other communication resources of the independently operated devices of the party.

13. The communication device of claim 12, wherein the other communication devices comprise a mobile device capable of voice communications.

14. The communication device of claim 1, wherein executing the computer instructions causes the controller to perform operations comprising utilizing a web-based distributed authoring and versioning protocol to synchronize the other communication resources of the party with the entry of the party in the task toolbar.

15. The communication device of claim 1, wherein the communication device operates in an Internet Protocol Multimedia Subsystem communication system.

16. The communication device of claim 1, wherein executing the computer instructions causes the controller to perform operations comprising:
detecting a request to drag and drop a completed task item in the completed task window to the pending task window; and
updating the pending task window to display that the completed task is now an additional pending task in the pending task window responsive to the request to drag and drop the completed task from the completed task window to the pending task window.

17. A method, comprising:
presenting a multiparty task toolbar on a display of a communication device;
creating, by the communication device, in the multiparty task toolbar an entry associated with a party;
creating, by the communication device, a task for the party;
assigning, by the communication device, the task to the entry; and
responsive to the creation and assignment of the task:
retrieving, by the communication device, information to identify a group of other communication resources of independently operated devices of the party as an identified group of other communication resources of independently operated devices of the party;
sending, by the communication device, a synchronization signal to the identified group of other communication resources of independently operated devices of the party synchronizing task data stored at the identified group of other communication resources of independently operated devices of the party with the entry in the multiparty task toolbar, the task data being configured for generating other multiparty task toolbars by the communication resources that are synchronized with the multiparty task toolbar;
presenting a user interface depicting tasks associated with the party on the display, wherein the user interface comprises a pending task window and a completed task window;
detecting a request to drag and drop a pending task in the pending task window from the pending task window to the completed task window; and
updating the completed task window to display that the pending task is now a completed task in the completed task window responsive to the request to drag and drop the pending task from the pending task window to the completed task window.

18. The method of claim 17, wherein the communication device utilizes a base unit for receiving communication services, and wherein the identified group of communication resources of the independently operated devices of the party comprises a wireless communication device.

19. The method of claim 17, comprising:
detecting a request to drag and drop a completed task item in the completed task window to the pending task window;
updating the pending task window to display that the completed task has become an additional pending task in the pending task window responsive to the request to drag and drop the completed task from the completed task window to the pending task window; and sending, by the communication device, an update signal synchronizing the identified group of other communication resources of the independently operated devices of the party to reflect a change in status of the task.

20. The method of claim 17, comprising:

receiving, by the communication device, a second task completion signal from one of the identified group of other communication resources of the independently operated devices of the party indicating that the task has been completed by the other communication resources of the party;

updating, by the communication device, the entry of the party in the multiparty task toolbar to reflect the completion of the task to create an updated entry; and sending, by the communication device, a completion synchronization signal further synchronizing the task data stored at the identified group of communication resources of the independently operated devices of the party with the updated entry in the multiparty task toolbar to reflect the completion of the task.

21. The method of claim 17, comprising:

associating, by the communication device, the task with a calendar event;

detecting, by the communication device, a trigger of the calendar event as a triggered calendar event;

retrieving, by the communication device, presence information associated with the party;

identifying, by the communication device, from the presence information one of the communication resources; and signaling, by the communication device, the identified communication resource of the triggered calendar event to cause the identified communication resource to assert an audible alert that informs the party of the triggered calendar event.

22. A web server operating as a portal, comprising:

a memory comprising computer instructions; and a controller coupled with the memory, wherein executing the computer instructions causes the controller to perform operations comprising:

presenting a user interface for entering tasks and calendar events;

creating a task;

assigning the task to a party;

recording the task and an association of the task to the party as a recorded task;

responsive to the creation, assignment and recordation of the task:

retrieving information to identify a group of other communication resources of independently operated devices of the party as an identified group of other communication resources of independently operated devices of the party;

sending a synchronization signal to the identified group of other communication resources of independently operated devices of the party to synchronize task data stored at the identified group of other communication resources of independently operated devices of the party with the recorded task, and the task data being configured for generating task toolbars by the identified group of communication devices that are synchronized with the user interface;

presenting a user interface depicting tasks associated with the party as a presented user interface, wherein the user interface comprises a pending task window and a completed task window;

detecting a request to drag and drop a pending task in the pending task window from the pending task window to the completed task window; and updating the completed task window to present that the pending task is now a completed task in the completed task window responsive to the request to drag and drop the pending task from the pending task window to the completed task window.

23. The portal of claim 22, wherein executing the computer instructions causes the controller to perform operations comprising:

detecting a request to drag and drop a completed task item in the completed task window to the pending task window;

updating the pending task window to display that the completed task is now an additional pending task in the pending task window responsive to the request to drag and drop the completed task from the completed task window to the pending task window; and sending a synchronization signal to further synchronize the task data stored at the identified group of other communication resources of the independently operated communication devices of the party to indicate that the pending task is now the completed task or that the completed task is now the additional pending task.

24. The portal of claim 22, wherein executing the computer instructions causes the controller to perform operations comprising:

receiving a completion signal from one of the communication devices of the party indicating that the task has been completed; and updating the recorded task to reflect the completion of the task.

25. The portal of claim 22, wherein executing the computer instructions causes the controller to perform operations comprising:

associating the task with a calendar event as a triggered calendar event;

detecting a trigger of the calendar event;

retrieving presence information associated with the party;

identifying from the presence information one of the communication resources; and signaling the identified communication resource of the triggered calendar event, wherein the signal causes the identified communication resource to assert an audible alert that informs the party of the triggered calendar event.

* * * * *